(12) United States Patent
Kim et al.

(10) Patent No.: US 8,905,807 B2
(45) Date of Patent: Dec. 9, 2014

(54) METHOD FOR CUTTING LIQUID CRYSTAL PANEL AND METHOD FOR MANUFACTURING LIQUID CRYSTAL PANEL USING THE SAME

(75) Inventors: Yong beom Kim, Incheon (KR); Dong hyun Kim, Incheon (KR)

(73) Assignee: Tovis Co., Ltd., Incheon (KR)

(*) Notice: Subject to any disclaimer, the term of this patent is extended or adjusted under 35 U.S.C. 154(b) by 166 days.

(21) Appl. No.: 13/377,674

(22) PCT Filed: Jun. 9, 2010

(86) PCT No.: PCT/KR2010/003688
§ 371 (c)(1),
(2), (4) Date: Dec. 12, 2011

(87) PCT Pub. No.: WO2010/143878
PCT Pub. Date: Dec. 16, 2010

(65) Prior Publication Data
US 2012/0083180 A1    Apr. 5, 2012

(30) Foreign Application Priority Data
Jun. 12, 2009  (KR) .................. 10-2009-0052386

(51) Int. Cl.
  *H01J 1/46* (2006.01)
  *G02F 1/1333* (2006.01)
  *C03B 33/07* (2006.01)

(52) U.S. Cl.
  CPC ........ *C03B 33/076* (2013.01); *G02F 1/133351* (2013.01)
  USPC .......................................... 445/25

(58) Field of Classification Search
  None
  See application file for complete search history.

(56) References Cited

U.S. PATENT DOCUMENTS

| | | |
|---|---|---|
| 6,204,906 B1 | 3/2001 | Tannas, Jr. |
| 6,512,196 B1 | 1/2003 | Yoon et al. |
| 2003/0155391 A1 | 8/2003 | Chae et al. |

FOREIGN PATENT DOCUMENTS

| | | |
|---|---|---|
| JP | 2000-155532 | 6/2000 |
| JP | 2001-125055 A | 5/2001 |
| JP | 2002-318547 A | 10/2002 |
| JP | 2004-144797 | 5/2004 |
| JP | 2005-202286 A | 7/2005 |
| KR | 2005-0044060 A | 5/2005 |

OTHER PUBLICATIONS

Machine translation of JP 2002-318547 A, published Oct. 31, 2002.*

* cited by examiner

*Primary Examiner* — Britt D Hanley
(74) *Attorney, Agent, or Firm* — Rabin & Berdo, P.C.

(57) ABSTRACT

The present invention relates to a method for cutting a liquid crystal display panel and a method for manufacturing a liquid crystal display panel having a desired size using the same. In a method for cutting a liquid crystal display panel which includes an upper panel to which a color filter is formed and a lower filter on which a thin film transistor is formed, the upper panel and the lower panel are respectively cut in such a way that a cut edge of the upper panel is outwardly protruded from a cut edge of the lower panel so that a step is formed at a cut surface between the upper panel and the lower panel. Since the cut edge of the upper panel is upwardly protruded from the cut edge of the lower panel, electrodes, signal lines, thin film transistors of the lower panel can be prevented from being damaged by the contact with the dispenser or by the pressure of the sprayed sealant while the sealant is formed after the cutting.

8 Claims, 2 Drawing Sheets

METHOD FOR CUTTING LIQUID CRYSTAL PANEL AND METHOD FOR MANUFACTURING LIQUID CRYSTAL PANEL USING THE SAME

FIELD OF THE INVENTION

The present invention relates to a method for cutting a liquid crystal display panel and a method for manufacturing a liquid crystal display panel having a desired size using the same.

BACKGROUND ART

Generally, a liquid crystal display (LCD) includes two display panels and a liquid crystal layer disposed therebetween and having a dielectric anisotropy. An electric filed is formed in the liquid crystal layer, and a transmittance of light passing the liquid crystal layer is regulated by regulating amplitude of the electric field so as to obtain a desired image. Such a liquid crystal display is representative one of a flat panel display (FPD), and TFT-LCD which uses thin film transistor (TFT) as a switching element is widely used.

A plurality of display signal lines i.e., gate lines and data lines, a plurality of thin film transistors and pixel electrodes are formed on a lower display panel of the two display panels of the liquid crystal display panel, and a color filter and a common electrode are formed on a upper display panel.

Generally, a liquid crystal display panel has one of some standardized sizes, so use of the liquid crystal panel for various purposes is limited by the standardized size.

In order to overcome this limitation, a technology for cutting a liquid crystal display panel for making a desired size has been introduced.

In manufacturing a liquid crystal display panel having a desired sized by cutting edge portions of an original liquid crystal display panel, a process for forming a sealant along a cut portion in order to seal a liquid crystal layer after cutting a upper display panel and a lower display panel is performed. At this time, the sealant layer is formed by moving a dispenser for spraying sealant along the cut portion, and during this process, the display signal lines or the thin film transistors on the lower display panel may be damaged by contact of the dispenser and the lower display panel or pressure of the sprayed sealant. The damage of the display signal lines or the thin film transistors may cause an error in the manufactured liquid crystal display panel.

DETAILED DESCRIPTION OF THE INVENTION

Technical Problem

The present invention has been made in an effort to provide a method for cutting a liquid crystal display panel in which damages on signal lines or thin film transistors which are formed on a lower panel during the process of forming a sealant which is needed for cutting a liquid crystal display panel can be minimized.

Technical Solution

According to an embodiment of the present invention, in a method for cutting a liquid crystal display panel which includes an upper panel to which a color filter is formed and a lower filter on which a thin film transistor is formed, the upper panel and the lower panel are respectively cut in such a way that a cut edge of the upper panel is outwardly protruded from a cut edge of the lower panel so that a step is formed at a cut surface between the upper panel and the lower panel.

The upper panel and the lower panel may be respectively cut such that the cut edge of the upper panel is outwardly protruded from the cut edge of the lower panel by 0.2 to 0.5 mm.

According to an embodiment of the present invention, a method for manufacturing a liquid crystal display panel of a desired size by cutting a liquid crystal display panel which includes an upper panel to which a color filter is formed and a lower filter on which a thin film transistor is formed includes: cutting the upper panel and the lower panel respectively cut in such a way that a cut edge of the upper panel is outwardly protruded from a cut edge of the lower panel so that a step is formed at a cut surface between the upper panel and the lower panel; and forming a sealant on the cut surface.

The forming of the sealant may be performed by spraying a sealant using a dispenser in a state that the liquid crystal display panel is turned over such that the lower panel is positioned above the upper panel.

The upper panel and the lower panel may be respectively cut such that the cut edge of the upper panel is outwardly protruded from the cut edge of the lower panel by 0.2 to 0.5 mm.

Advantageous Effects

According to a present invention, in the cutting of a liquid crystal display panel which includes an upper panel to which a color filter is formed and a lower filter on which a thin film transistor is formed, the cut edge of the upper panel is upwardly protruded from the cut edge of the lower panel, so electrodes, signal lines, thin film transistors of the lower panel can be prevented from being damaged by the contact with the dispenser or by the pressure of the sprayed sealant while the sealant is formed after the cutting.

BEST MODE

Figure 1:
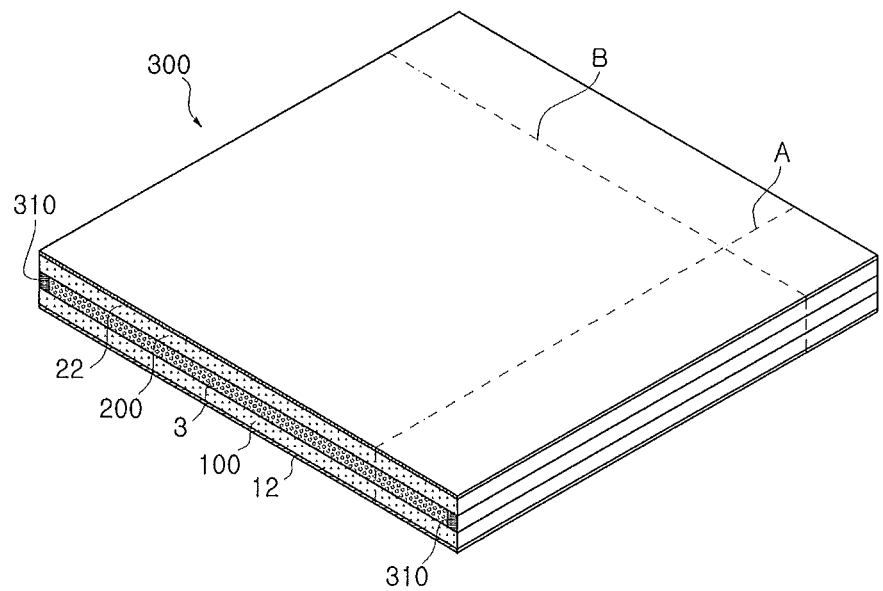
FIG. 1 is a perspective view of a liquid crystal display panel to which a method for cutting a liquid crystal display panel according to an embodiment of the present invention may be applied.

The present invention will now be described more fully hereinafter with reference to the accompanying drawings, in which preferred embodiments of the invention are shown.

In the drawings, the thickness of layers, films, panels, regions, etc. are exaggerated for clarity. Like reference numerals designate like elements throughout the specification. It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 2:
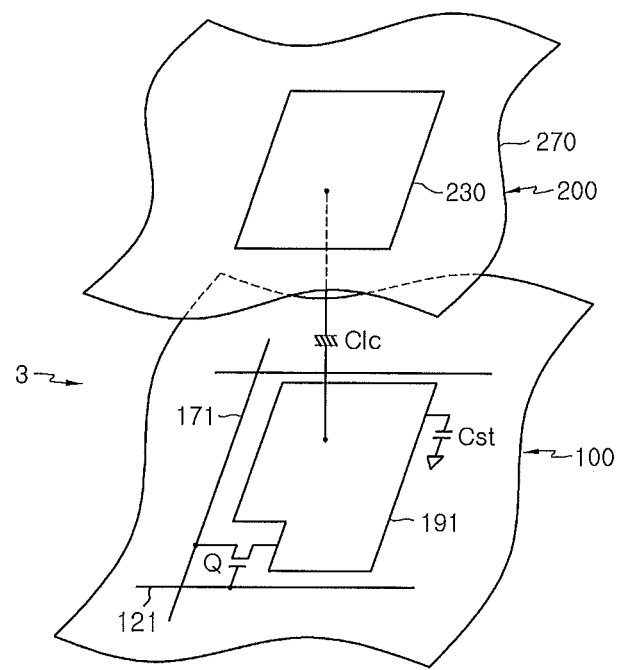
FIG. 2 is an equivalent circuit diagram of one pixel of a liquid crystal display of FIG. 1.

Referring to FIG. 1 and FIG. 2, liquid crystal panel assembly 300 to which a cutting method according to an embodiment of the present invention includes lower and upper panels 100 and 200 which face each other, and a liquid crystal layer 3 which is interposed between panels 100 and 200 and includes liquid crystal molecules which are aligned vertically or horizontally. Lower panel 100 may be referred to as a thin film transistor array panel, and upper panel 200 may be referred to as a color filter array panel.

Meanwhile, not shown in the drawings, liquid crystal display panel 300 may include a plurality of data lines which substantially extend in a column direction and are substantially parallel with each other, gate lines which substantially extend in a row direction and are substantially parallel with each other, and a plurality of pixels which are connected to these lines and are substantially arranged in a matrix shape.

A sealant 310 which is made of material for bonding two panels 100 and 200 and defines a space which is filled with liquid crystal and prevents leak of liquid crystal is formed at edges of two panels 100 and 200, and polarizers 12 and 22 for polarizing light are respectively attached to outer surfaces of two panels 100 and 200. One of polarizers 12 and 22 may be omitted.

Each pixel PX includes a switching element Q connected to data line 171 and gate line 121, and a liquid crystal capacitor Clc and a storage capacitor Cst connected thereto. If necessary, storage capacitor Cst may be omitted.

Switching element Q is a three terminal element such as a thin film transistor, etc. provided to lower panel 100, a control terminal thereof is connected to gate line 121, an input terminal thereof is connected to data line 171, and an output terminal thereof is connected to liquid crystal capacitor Clc and storage capacitor Cst.

Liquid crystal capacitor Clc has two terminals of a pixel electrode 191 of lower panel 100 and a common electrode 270 of upper panel 200, and liquid crystal layer 3 between two electrodes 191 and 270 serves as a dielectric material. Pixel electrode 191 is connected to switching element Q, and common electrode 270 is formed on the entire surface of upper panel 200 and a common voltage is applied thereto. Storage capacitor Cst assists liquid crystal capacitor Clc and maintains the data voltage applied to pixel electrode 191 for a predetermined period.

Meanwhile, for realizing color display, each pixel PX uniquely displays one of primary colors (spatial division) or each pixel PX alternately displays primary colors (temporal division) as time lapses, and a desired color is recognized by a spatial and temporal sum of primary colors. Examples of primary colors include three primary colors including red, green, and blue. FIG. 2 shows an example of a spatial division, and in this example, each pixel PX has a color filter 230 for one of the primary colors in a region of upper panel 200 corresponding to pixel electrode 191. Unlike FIG. 2, color filter 230 may be formed above or below pixel electrode 191 of lower panel 100.

Difference between data voltage applied to pixel electrode 191 and common voltage applied to common electrode 270 is represented as charge voltage, i.e., pixel voltage. Liquid crystal molecules are aligned differently depending on the magnitude of pixel voltage, and accordingly polarization of light passing through liquid crystal layer 3 varied, and variation of polarization causes variation of transmittance of light according to polarizers 12 and 22.

A method for manufacturing a liquid crystal display panel having a desired size by cutting and fabricating the above-described liquid crystal display panel will be described with reference to FIG. 3 and FIG. 4.

Figure 3:
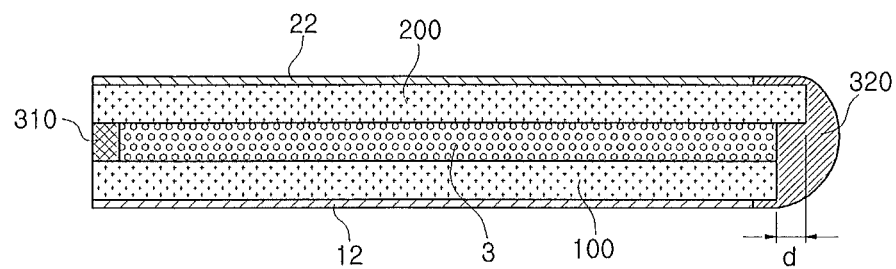
FIG. 3 is a cross sectional view of a liquid crystal display panel which is manufactured by cutting a liquid crystal display panel of FIG. 1 along one direction.

FIG. 3 is a cross sectional view of a liquid crystal display panel which is manufactured by cutting a liquid crystal display panel of FIG. 1 along one direction.

Referring to FIG. 3, liquid crystal display 300 may be cut along a cutting line A or a cutting line B according to a desired size. The cutting line A is parallel with gate line 121, and the cutting line B is parallel with data line 171. Cutting method can be applied in the same way whenever liquid crystal display 300 is cut in both directions.

At first, polarizers 12 and 22 of liquid crystal display 300 are stripped by a predetermined width along a direction A or B. If polarizers 12 and 22 are stripped, lower panel 100 and upper panel 200 are exposed. Subsequently, a cutting position is selected by inspecting exposed lower and upper panels 100 and 200 with a microscope or the like.

Subsequently, a first scribe line may be made approximately to a center depth of upper panel 200 along the selected cutting position using a diamond wheel, a diamond needle, a laser or the like, and then liquid crystal display 300 may be turned over and a second scribe line may be made approximately to a center depth of lower panel 100.

Upper panel 200 and lower panel 100 are steadied for about 30 minutes in a state that the scribe lines are formed. Natural crack is formed along the scribe lines formed in two panels 100 and 200 during steadying, so air is introduced into liquid crystal layer 3, and if air is introduced into liquid crystal layer 300, leak of liquid crystal layer 3 is temporarily restricted by the introduced air.

After such a steadying step, if a predetermined force is applied from the outside, liquid crystal display 300 is cut along the scribe lines. A sealant 320 is covered on the cut portion so as to prevent leak of liquid crystal from the cut portion.

A liquid crystal display panel of a desired sized can be manufactured through these processes.

At this time, according to an embodiment of the present invention, step between the cut surface of upper panel 200 to which color filter 230 is formed and the cut surface of lower panel 100 to which thin film transistors are formed, so that the total cut surface is formed as a stepped surface, and the step is formed such that the cut surface of upper panel 200 is protruded from the cut surface of lower panel 100 to the outside. That is, as shown in FIG. 3, upper and lower panels 200 and 100 are respectively cut in such a way that the cut edge of upper panel 200 are positioned outer than the cut edge of lower panel 100.

At this time, the gap d between the cut edges of upper panel 200 and lower panel 100 may be between 0.2 to 0.5 mm.

As such, since the cut edge of upper panel 200 is outwardly protruded from the cut edge of lower panel 100, electrodes, signal lines, and thin film transistors which are formed on lower panel 100 can be prevented from being damaged by the contact with an end portion of a dispenser 400 spraying sealant 320 or by the pressure of the sealant.

Figure 4:
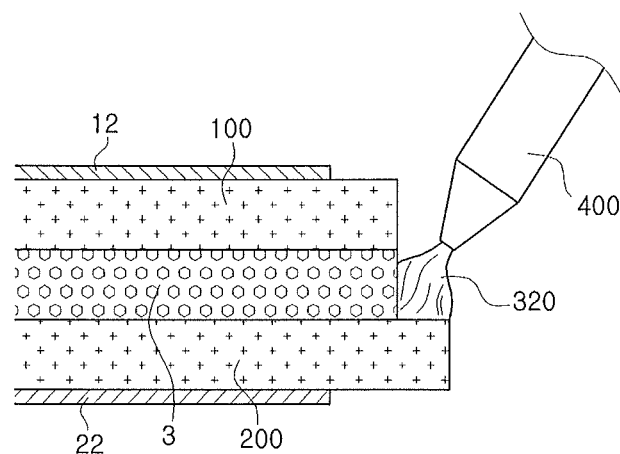
FIG. 4 is a drawing for explaining a process for forming a sealant layer in a method for cutting a liquid crystal display panel according to an embodiment of the present invention.

In more detail, referring to FIG. 4, since the cut surface of upper panel 200 is outwardly protruded from the cut surface of lower panel 100, the upper surface of lower panel 100 does not directly contact the dispenser 400 and the sealant 320 sprayed from dispenser 400 does not directly contact the upper surface of lower panel 100, so damages of electrodes, signal lines, thin film transistors which are formed on the upper surface of lower panel 100 during the process of forming sealant 320 can be minimized. Accordingly, the production yield of the cut liquid crystal display panel and the efficiency of the manufacturing process can be substantially improved.

At this time, as shown in FIG. 4, sealant 320 may be sprayed from dispenser 400 in a state that liquid crystal display panel 300 is turned over such that lower panel 100 is positioned above upper panel 200, and accordingly damages of signal lines or thin film transistors of lower panel 100 can be further effectively prevented and sealant 320 can be effectively formed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a method for cutting a liquid crystal display panel and can be used for manufacturing a display device having various sizes, so it has an industrial applicability.

The invention claimed is:

1. A method for manufacturing a liquid crystal display panel of a desired size by cutting the liquid crystal display panel which includes an upper panel to which a color filter is formed, a lower panel on which a thin film transistor is formed and an original sealant, the method comprising:
cutting the upper panel and the lower panel respectively along a first cutting line and a second cutting line in such a way that a cut edge of the upper panel formed by the first cutting line is outwardly protruded from a cut edge of the lower panel formed by the second cutting line so that a step is formed at a cut surface between the upper panel and the lower panel, the first cutting line and the second cutting line being respectively located in a viewing area of the liquid crystal display panel so that at least a part of the original sealant that is disposed outside the first and second cutting lines is removed from the liquid crystal display panel; and
after the cutting, forming another sealant on the cut surface.

2. The method of claim 1, wherein the forming of the another sealant is performed by spraying the another sealant using a dispenser in a state that the liquid crystal display panel is turned over such that the lower panel is positioned above the upper panel.

3. The method of claim 1, wherein the upper panel and the lower panel are respectively cut such that the cut edge of the upper panel is outwardly protruded from the cut edge of the lower panel by 0.2 to 0.5 mm.

4. The method of claim 1, further comprising before the cutting the upper panel and the lower panel, providing the lower and upper panels to each have first and second dimensions, the first dimensions being identical, and the second dimensions being identical,
wherein during the cutting, the upper and lower panels are cut so that the first dimensions are different from each other, and the second dimensions are different from each other.

5. The method of claim 1, further comprising before the cutting the upper panel and the lower panel, providing the lower and upper panels to each have a first dimension, the first dimensions being identical,
wherein during the cutting, the upper and lower panels are cut so that the first dimensions are different from each other.

6. The method of claim 1, wherein in the cutting the upper panel and the lower panel, all of the original sealant that is disposed outside the first and second cutting lines is removed from the liquid crystal display panel.

7. The method of claim 1, wherein the step is formed at only two sides of the liquid crystal display panel.

8. A method for manufacturing a liquid crystal display panel of a desired size, the method comprising:
inserting a liquid crystal layer between a color filter array panel and a thin film transistor array panel;
after the inserting, cutting the liquid crystal layer, the color filter array panel and the thin film transistor array panel respectively in such a way that
a cut edge of the color filter array panel is outwardly protruded from a cut edge of the thin film transistor array panel so that a step is formed at a cut surface between the color filter array panel and the thin film transistor array panel, and
a portion of the liquid crystal layer is removed; and
after the cutting, forming a sealant on the cut surface.

* * * * *